United States Patent

[11] 3,608,060

| [72] | Inventors | Harry E. Osment;<br>Raymond L. Williams, both of Baton Rouge, La. |
|---|---|---|
| [21] | Appl. No. | 761,283 |
| [22] | Filed | Sept. 20, 1968 |
| [45] | Patented | Sept. 21, 1971 |
| [73] | Assignee | Kaiser Aluminum & Chemical Corporation<br>Oakland, Calif. |

[54] METHOD OF MAKING A FOAMED ALUMINA SHAPE OR CATALYST SUPPORT
10 Claims, No Drawings

[52] U.S. Cl. ........................................ 264/42, 23/141, 106/40, 106/65, 106/87, 106/104, 106/122, 252/463
[51] Int. Cl. ........................................ C04b 21/02, B01j 11/60
[50] Field of Search ........................................ 264/42; 106/40, 87, 88, 104, 122, 65; 23/141; 252/448, 463

[56] References Cited
UNITED STATES PATENTS

| 3,497,455 | 2/1970 | Ahr | 252/62 |
| 2,895,920 | 7/1959 | Janoski | 252/458 |
| 2,852,473 | 9/1958 | Welling | 252/455 |
| 2,915,365 | 12/1959 | Saussol | 23/142 |
| 2,919,997 | 1/1960 | Zehrlant | 106/104 |
| 3,009,885 | 11/1961 | Bertolacini | 252/441 |
| 3,038,784 | 6/1962 | Torkar et al. | 252/463 |
| 3,041,190 | 6/1962 | Griffith et al. | 106/104 |
| 3,114,720 | 12/1963 | Nixon | 252/448 |
| 3,147,177 | 9/1964 | Owens et al. | 106/87 |
| 3,222,129 | 12/1965 | Osment et al. | 23/141 |
| 3,223,483 | 12/1965 | Osment | 252/463 |
| 3,226,191 | 12/1965 | Osment et al. | 23/141 |
| 3,223,537 | 12/1965 | Wiegert et al. | 106/40 |
| 3,497,455 | 2/1970 | Ahr | 106/122 |

FOREIGN PATENTS

| 763,470 | 7/1967 | Canada | 106/122 |

*Primary Examiner*—Julius Frome
*Assistant Examiner*—John H. Miller
*Attorneys*—James E. Toomey, Paul E. Calrow, Harold L. Jenkins and Andrew E. Barlay ABSTRACT: A hydrated alumina which has been calcined to reduce its loss on ignition to below 12 percent and which is capable of at least partial rehydration is mixed with water and a blowing agent to form a slurry. The slurry is heated to below 100° C. to activate the blowing agent causing bubbles to form in the slurry. The slurry is then poured into a mold and heated to cause the alumina to rehydrate stabilizing the foamed body which is then activated at 350°–700° C.

METHOD OF MAKING A FOAMED ALUMINA SHAPE OR CATALYST SUPPORT

BACKGROUND OF THE INVENTION

This invention relates to a method of producing cellular activated alumina shapes.

Activated alumina is generally employed as a desiccant for removing moisture from gases, vapors and nonaqueous liquids. It is also widely used as a catalyst for chemical reactions and as a catalyst carrier impregnated with a catalytic composition. For all of these applications, it is desired to use an alumina which has a relatively large contact surface area and simultaneously low-bulk density. The higher the contact surface of the activated alumina, the larger the effective area which can be utilized for adsorption and catalysis. A further requirement for activated alumina is to possess sufficient strength to withstand pressures without change in its physical appearance. This is particularly important in applications where the activated alumina is utilized in columns as a desiccant. In drying columns a substantial quantity of activated alumina is employed, usually arranged in successive layers. Unless the activated alumina has sufficient strength, the alumina occupying the bottom section of the column will easily abrade because of the pressure exerted by the upper layers. This can lead to a plugged flow of the gases or liquids conducted through the column.

Activated alumina produced from alumina trihydrate, such as obtainable from the Bayer process, is also utilized as an adsorbent and a catalyst. In the conventional process of producing activated alumina from Bayer-process alumina trihydrate, the alumina trihydrate is at first calcined to obtain an alumina which is capable of at least partial rehydration. Subsequent to partial calcination, the alumina is cured to develop strength properties and then activated. The activated alumina produced by these processes will possess good contact surface characteristics coupled with reasonable strength.

To further improve strength properties, while retaining the effective surface area, calcined alumina has been nodulized. Alumina nodules exhibit a relatively large surface area such as 200-300 m.$^2$/g. and considerable strength. The bulk density of the activated alumina nodules is usually between 720-800 kg./m.$^3$, which requires utilization of considerable quantities of activated alumina.

The combination of strength and high contact surface area of the activated alumina with low-bulk density is therefore of great importance as it reduces the volume of activated alumina to be employed as a desiccant, catalyst or catalyst support and allows the utilization of considerably lesser volumes of activated alumina for the same purpose.

BRIEF SUMMARY OF THE INVENTION

Cellular, high contact surface area, activated alumina shapes of low bulk density are produced from selectively calcined alumina trihydrate. The selective calcination is accomplished at temperatures above about 450° C. and below the temperature at which the alumina is transformed into corundum, to produce an alumina having a loss on ignition less than 12 percent by weight and which alumina is capable of at least partial rehydration. The selectively calcined alumina is then ground and contacted in the presence of water with an agent capable of forming bubbles at temperatures of from about 0° to about 100° C. The bubbles will rise through the alumina, thereby producing the voids or pores during simultaneous partial rehydration. The cellular or foamed alumina is then shaped to the desired configuration and activated. If the alumina is to be utilized as a catalyst support or carrier, impregnation of catalytic material can be accomplished at any stage subsequent to the selective calcination.

DETAILED DESCRIPTION OF THE INVENTION

In accordance with the method of the present invention, alumina trihydrate is selectively calcined to produce an alumina capable of at least partial rehydration. The alumina trihydrate utilized in the present method can be obtained from any suitable source, for example, from the Bayer process. The selective calcination of the alumina trihydrate particles can be accomplished at temperatures in excess of 450° C. and below the temperature required to convert the alumina into the nonrehydratable form of corundum.

A particularly suitable method for the selective calcination of alumina trihydrate particles is described in U.S. Pat. No. 3,222,129 to H. E. Osment et al., wherein the alumina trihydrate particles, surrounded with a fuel-air mixture, pass through a combustion zone. The particles are maintained in the combustion zone for a time period sufficient to ensure partial or selective calcination of each of the particles. The temperature of the combustion zone is preferably maintained at about 1,650°-1920° C. Any other calcination method which produces a selectively calcined alumina, capable of at least partial rehydration, can be employed for the production of the cellular activated alumina shapes of the present invention. As mentioned above, the term "selectively calcined alumina" refers to an alumina which after the calcination step is capable of at least partial rehydration and which has a loss on ignition less than 12 percent by weight. Chemically, this means that the calcined alumina will be capable of combining with water molecules and this rehydration will increase the strength by means of the formation of a crystalline alumina structure.

Subsequent to the selective or partial calcination, the alumina particles are cooled. The cooling can be accomplished by any conventional means, but for best results rapid quenching is recommended. Rapid cooling or quenching to 400° C. or below will prevent premature rehydration by means of the moisture present in the air; however, if dry air is utilized, slow cooling can also be employed.

The selectively calcined alumina particles are then ground to provide a finely divided alumina; for example, alumina passing through a screen having openings of approximately 1.7 millimeters. This finely ground alumina can be mixed with coarser ground alumina to achieve increased adsorption capacity and contact surface area.

To form the cellular alumina shape, the finely divided alumina is contacted in the presence of water with an agent which is capable of forming or releasing bubbles at temperatures of from about 0° to about 100° C.

The amount of water to be added to the selectively calcined and finely divided alumina depends on the type of agent used to form the pores or voids in the alumina. It is at least sufficient to induce partial rehydration of the alumina, but for best results it is preferred to slurry the alumina prior to contact with the pore forming agent. The pore- or void-forming agent utilized in the present invention can be suitably selected from gases, organic liquids having a boiling point between about 0° and 100° C., inorganic peroxides capable of decomposing into gaseous products and other substances.

In case a gas, such as air, nitrogen, gaseous chlorinated fluorocarbons or carbon dioxide is utilized, the volume introduced and the rate of bubbling through the slurry will determine the pore size and pore number. This can be controlled according to the desired end use of the porous activated alumina shape. It is to be understood that the use of solid carbon dioxide (dry ice) is also contemplated under the term of "carbon dioxide," as it is evident that within the temperature range given above, the solid carbon dioxide will release bubbles capable of forming voids or pores in the finely divided alumina.

Organic liquids can also be employed as bubble releasing or forming agents, the only criteria being that they possess a boiling point between about 0° and 100° C. The organic liquids falling within this class include alcohols such as methanol (b.p. 64.9° C.), ethanol (b.p. 78.5° C.), ethers, such as diethylether (b.p. 34.6° C.), chlorinated fluorocarbons, such as trichlorofluoromethane (b.p. 23.7° C.). It will be self-evident to persons skilled in the art that the above-recited compounds are only representative examples and within the boiling point ranges given, any organic liquid can be employed for the purposes of the present invention. The only limitation within that scope is the inertness of the liquid towards the alumina. The term "inertness," for the purposes of the present invention, defines the absence of chemical reaction between the alumina and the organic liquid employed and the absence of catalyst-poison effect.

The use of gaseous agents or inert organic liquids having a boiling point between 0° C. and 100° C. will prevent the contamination of the alumina with foreign substances as no chemical reaction will take place between the pore-forming compound and the alumina. This is of particular importance where the foamed alumina shape is to be employed as a catalyst or a catalyst support. Introduction of foreign substances into the pores or voids of the porous alumina can poison the catalyst and reduce the catalytic effect.

Inorganic compounds, such as peroxides, can also be employed for the purpose of accomplishing the pore-forming according to the process of the present invention. In case the porous activated alumina shapes are employed as catalysts or as catalyst supports, the introduction of cations which can detrimentally affect the performance of the catalyst should be avoided. This can be accomplished by the utilization of hydrogen peroxide which decomposes into water and oxygen. The commercially available aqueous hydrogen peroxide solution (30 percent by weight) is suitably employed for the pore formation. For best results, an aqueous hydrogen peroxide solution is utilized having a concentration of from about 0.1 to about 15 percent by weight. When a hydrogen peroxide solution within the above range is used, the activated, alumina shape will exhibit highly developed controlled pores or voids. For best results, the weight ratio of calcined alumina to hydrogen peroxide solution within the 0.1–15 percent concentration range is maintained of from 1 to 0.5–0.8. That is, to each 1,000 grams of alumina, 500–800 grams of aqueous hydrogen peroxide solution is added wherein the hydrogen peroxide solution contains from about 1 to 50 grams of hydrogen peroxide dissolved. When the cellular activated alumina is to be used as a desiccant, alkali metal peroxides such as sodium peroxide can also be employed. For this utility the presence of foreign cations is of no concern. As the rate of decomposition of sodium peroxide is more rapid than the rate of decomposition of hydrogen peroxide under the same conditions, pore volume and size control is to be exercised by the gradual addition of sodium peroxide to the aqueous slurry of alumina.

Contact between the alumina slurry and the peroxide solution can be accomplished by admixing the two systems. Agitation of the admixture will facilitate uniform distribution of the bubbles throughout the alumina and the formation of pores of even size and shape.

Subsequent to the contacting or admixing of alumina slurry with the pore forming agent, the mixture is poured or cast into molds where the desired configuration is obtained. The admixture can also be shaped into granules, pellets, extrudates, etc. For this a mandrel or core can be used in combination with a mold.

The consistency of the alumina should be such as to facilitate the pouring or casting of the shapes. It was found that a free-flowing paste will produce the best results, as it can be rapidly poured into the mold. Also, the pore formation will be accomplished at a faster rate and the distribution and size of the voids will be more uniform.

Subsequent to pouring or casting of the alumina slurry into the mold, the expansion of the mixture will be completed and the bubble formation ceases or is interrupted. The onset of partial rehydration of the selectively calcined alumina will then render the shape rigid. In case the free-flowing paste is made of selectively calcined alumina and hydrogen peroxide solution, the paste is rapidly poured or cast in a mold and the release of oxygen from the decomposition of hydrogen peroxide will instantaneously start the pore or void formation.

When an alumina of hydrogen peroxide solution (50 percent by weight) weight ratio of about 1:1 to 1:0.7 is utilized, the decomposition of the hydrogen peroxide will take place in less than 20 minutes at room temperature. As the presence of water induces partial rehydration of the selectively calcined alumina, the exothermic nature of this rehydration will generate higher temperatures within the slurry or paste. Therefore, the decomposition of the hydrogen peroxide can take place within a shorter time.

If a gaseous agent, such as air, is employed for forming the pores in the alumina, the pore formation can be either accomplished in a pasty alumina slurry by rapid agitation or beating accompanied by bubbling of air through the paste, or in the mold itself by introducing the gaseous agent in the mold.

Water-miscible or immiscible organic solvents can also be used. For example, if a chlorinated fluorocarbon of low boiling point is utilized, the fluorocarbon can be admixed with the aqueous alumina slurry and by maintaining the temperature of the admixture at or slightly above the boiling point of the fluorocarbon, pore formation will be initiated. The pore formation is continued in the slurry and, if desired, terminated in the mold. It is also possible to employ a mold maintained at or above the boiling point of the organic liquid by heat transfer or by direct heating of the mold. If the mold is heated or the slurry is maintained at temperatures higher than room temperature, the onset of rehydration will be more rapid and the shape will become rigid within a short time period. Consequently, for best results, when an organic liquid is used as a pore-forming agent, the boiling point of which is above room temperature, the pore formation is advantageously accomplished in the shaping mold.

When the production of a porous alumina body having specific catalytic properties is desired or the shape is to be employed as a catalyst carrier, the catalytic agent, such as platinum, can be introduced at any stage in the method of the present invention prior to activation. This can be accomplished by using an aqueous solution of a metallic salt in admixture with the aqueous alumina slurry prior to the introduction of the pore-forming agent. A nonaqueous metallic salt dispersion can be utilized in the same manner. The bubbles produced by the pore-forming agent will evenly distribute the metallic salt throughout the alumina slurry and will provide uniform catalytic properties for the alumina. It is also possible to disperse the catalytic compound throughout the rigid porous alumina shape by either immersion or by spraying the alumina shape with an aqueous solution or nonaqueous dispersion of the metallic salts. Immersion impregnation is considered to be advantageous, as the metallic salt can contact the entire surface area of the alumina, including the surfaces defining the pores. However, other impregnation techniques, such as direct deposition of the metals on the entire surface area of the cellular alumina by vapor deposition, are also contemplated by the method of the present invention.

As mentioned above, contact with the aqueous media will induce partial rehydration of the selectively calcined alumina. This partial rehydration or curing will develop the strength properties of the porous shapes made from selectively calcined alumina. The rehydration or curing of the shapes can be accomplished either at room or at higher temperatures. A commonly employed curing process involves maintaining the selectively calcined alumina in a closed vessel in the presence of moist air. The exothermic nature of the curing or partial rehydration will provide the necessary heat to accomplish this strength forming step. Another curing process employs immersion of the selectively calcined alumina in an aqueous medium, thereby accelerating the partial rehydration and also providing uniform distribution of water throughout the alumina. This type of curing can be utilized at temperatures within the range of 20°–99° C. At higher temperatures within this range the partial rehydration will take place at an accelerated rate.

For purposes of the present invention, any conventional method of curing or rehydration can be used. For best results, however, particularly where the porous alumina shape is to be impregnated with a catalytic agent, immersion curing is advantageously utilized. Although this immersion curing can be accomplished at temperatures within 20°–98° C., to develop full strength of the porous alumina shape within a relatively short time period, curing temperatures within the range of 70°–95° C. are preferred. Temperatures in excess of 100° C. can be used for curing, but this may affect the structure of the porous alumina by causing collapse of some of the pores. After the maximum strength properties of the porous alumina shape are developed, the temperature can be raised above 100° C. without influencing in a detrimental manner the structure of the porous alumina shape.

To obtain the activated cellular alumina shape having well-developed voids, high contact surface area, high moisture-adsorption capacity and catalytic properties, the shape is heated to temperatures in excess of 100° C. after removal from the mold. Activation temperatures in excess of 350° C. are advantageously employed and, for best results, a temperature range of 350°–700° C. is utilized. Within this temperature range the surface of the porous alumina shape will be activated and also any entrapped moisture or organic liquid residue will be removed.

If the porous alumina shape is impregnated with a metallic salt, for example, with sodium chloroplatinate, decomposition or reduction to the metallic platinum will take place within the activation temperature range of about 350°–700° C.

In some instances it is desired to avoid contamination of the porous alumina with alkali metal ions. This is particularly desirable when the porous alumina shape is to be utilized as a catalyst impregnated with a metal and where the alkali metal ions would act as a catalyst poison. When alumina trihydrate from the Bayer process is used for the production of selectively calcined alumina utilized in the method of the present invention, inherently sodium ion impurities will be present, resulting from the alkali digestion of bauxite. The amount of sodium ions present in the alumina trihydrate ranges from about 0.5 to 1 percent by weight, and this sodium ion quantity may affect detrimentally the catalytic activity of the impregnated activated porous alumina shape. Removal of the sodium ions prior to impregnation and void formation can be advantageously accomplished by the method described in U.S. Pat. No. 3,223,483 to H. E. Osment, wherein the sodium ion content of selectively calcined alumina is reduced below the catalytic poison level by washing with deionized water. This process can be combined with the method of the present invention in case a low sodium ion content in the porous activated alumina catalyst shape is desired.

The cellular activated alumina shapes produced according to the method of the present invention exhibit high contact surface area, good strength and low-bulk density.

To more clearly describe the method of the invention, the following examples are set forth merely as illustrations and should not be construed as limitations upon the scope of the invention.

EXAMPLE I

Ground, selectively calcined alumina having a loss on ignition of about 5 percent and a particle size of 95 percent minus 44 microns is blended with 70 percent by weight of a 5 percent $H_2O_2$ solution. The mixture formed a relatively thin slurry which began to foam spontaneously within a few minutes, the foaming action being essentially complete after 10 minutes. The rigid mass formed was placed in an oven at 80° C. in a sealed container for 20 hours to cure and harden the foamed mass. At this temperature the rehydration reaction was completed, thus developing the strength properties of the foamed mass.

After curing, the foamed mass was crushed and screened to form 1.27×0.63 cm. granules. These granules are suitable for charging into a catalyst reactor bed or column. The granules were activated at 400° C. for 1 hour in a stream of hot air. The granules were analyzed and results were as follows: moisture sorptive capacity 14 percent (24 hours at 60 percent relative humidity); adsorption surface area 247 m.$^2$/g. (by the B.E.T. method); bulk density 260 kg./m.hu 3.

Crushing strength of the granules was determined as follows: several cubes (2.54×2.54×2.45 cm.) were cut out from the cured mass and activated for 1 hour in air at 400° C. The activated cubes were placed in Carver laboratory press and pressure was applied to the point of collapse. Crushing values ranged from 21.5 to 25.0 kg./cm.$^2$ with an average of 23.0 kg./cm.$^2$.

EXAMPLE II

A selectively calcined alumina composition consisting of two parts of unground selectively calcined alumina of approximately 50 percent minus 74 microns were dry blended with one part of 95 percent minus 44 microns flashed calcined alumina. To this composition 70 percent by weight of 3 percent $H_2O_2$ solution was added. The mixture was foamed, crushed, sized, and activated as shown in Example I. The following analytical results were obtained: moisture sorptive capacity, 19.45 percent; adsorption surface area, 300 m.$^2$/g.; bulk density 235 kg./m.$^3$.

Crushing-strength determination was performed as described in Example I, providing a crushing-strength value of 15.7 kg./cm/$^2$. Thus, the increase is adsorption capacity resulted in a decrease in strength.

Moisture Sorptive Capacity at 60 percent R.H. (Relative Humidity)—A weighted sample of the material is placed in a desiccator having suitable means for maintaining the relative humidity at 60 percent (for example, a reservoir of sulfuric acid solution which can be agitated). The sample is allowed to remain in the desiccator for a time sufficient for equilibrium to be achieved, e.g., 24 hours. The sorptive capacity is obtained by the following equation:

Percent Moisture Sorptive Capacity at 60 percent R.H. =

$$\frac{\text{sample increase in weight with adsorbed moisture weight}}{\text{sample weight prior to adsorption}} \times 100$$

Adsorption surface area: Measured by the Brunauer, Emmett and Teller method as described in J. Am. Chem. Soc., Volume 60, page 309 (1938).

For the purposes of the present invention, the term "an agent capable or releasing bubbles" refers to all of those gaseous, liquid or solid substances which at the temperatures of from about 0° C. to about 100° C. are capable of releasing bubbles by either boiling within the temperature range given or by decomposing wholly or partially into at least one gaseous component. Substances which are in gaseous form within the temperature range of 0°–100° C. are within the scope of the above definition by nature, since when introduced into the alumina slurry will tend to rise to the surface.

The term "contact surface area" as used herein defines not only the adsorption surface area which usually relates to the microporous structure and is measured by the "Brunauer, Emmett and Teller" method, but also includes the microporous structure modified and increased by the method of the invention. Thus, the "adsorption surface area" measurements shown in the examples provide only the microporous surface area, but do not include the microporous surface area.

Although the invention has been described in considerable detail in the foregoing, it is to be understood that such detail is solely for the purpose of illustration and that variations can be made therein by those skilled in the art, without departing from the spirit and scope of the invention.

What is claimed is:

1. A method of forming high contact surface area, cellular active alumina which comprises:
   a. grinding to a finely divided state an alumina which has been selectively calcined at a temperature above about 450° C. and below that temperature at which transformation to corundum occurs, said alumina being capable of at least partial rehydration and having a loss on ignition less than 12 percent by weight;
   b. slurrying the finely divided alumina in an amount of water sufficient to effect at least partial hydration thereof;

c. contacting the alumina slurry with an agent capable of releasing bubbles between 0° and 100° C. without entering into chemical reaction with the alumina and causing bubbles to form and to rise through the alumina slurry to form pores in the alumina;
d. pouring the alumina slurry into a mold to obtain a desired configuration;
e. curing the alumina by rehydration thereof at a temperature between 20° and 98° C.; and
f. activating the rehydrated alumina at a temperature of from 350° to about 700° C.

2. The method of claim 1, wherein the finely divided alumina is admixed prior to partial rehydration with a portion of unground, selectively calcined alumina.

3. The method of claim 1, wherein the curing temperature is of from 70° to about 95° C.

4. The method of claim 1 wherein the amount of water added to the finely divided alumina is sufficient to produce a free-flowing slurry.

5. The method of claim 1, wherein the agent capable of releasing bubbles is a gaseous substance at temperatures between 0° and 100° C.

6. The method of claim 5 wherein the gaseous substance is selected from the group consisting of air, nitrogen, carbon dioxide and chlorofluorocarbons having a boiling point below 0° C.

7. The method of claim 1, wherein the agent capable of releasing bubbles is a liquid having a boiling point within the temperature range of from about 0° C. to about 100° C.

8. The method of claim 7, wherein the liquid is selected from the group consisting of alcohols, ketones, ethers and chlorofluorocarbons having a boiling point between 0° and 100° C.

9. The method of claim 1, wherein the agent capable of releasing bubbles is a hydrogen peroxide solution.

10. The method of claim 9, wherein the hydrogen peroxide concentration in the solution is 0.1 to 15 percent by weight.

UNITED STATES PATENT OFFICE
CERTIFICATE OF CORRECTION

Patent No. 3,608,060          Dated September 21, 1971

Inventor(s) Harry E. Osment and Raymond L. Williams

It is certified that error appears in the above-identified patent and that said Letters Patent are hereby corrected as shown below:

Column 3, line 74, "of" should be -- to --;

Column 3, line 74, "50 per" should be -- 5 per --;

Column 6, line 2, "/m. hu 3" should be -- /m 3 --;

Column 6, line 4, "x 2.45 cm.)" should be -- x2.54 cm.) --;

Column 6, line 25, "kg./cm/$^2$" should be -- kg/cm$^2$ --;

Column 6, line 44, "capable or releasing" should be -- capable of releasing --;

Column 6, line 56, "microporous" should be -- macroporous --; and

Column 6, line 61, "microporous" should be -- macroporous --.

Signed and sealed this 28th day of March 1972.

(SEAL)
Attest:

EDWARD M. FLETCHER, JR.          ROBERT GOTTSCHALK
Attesting Officer          Commissioner of Patents